United States Patent [19]
Saitoh

[11] 3,856,324
[45] Dec. 24, 1974

[54] CONNECTING MEANS BETWEEN AN IMPACT ABSORBING SIDE FRAME MEMBER OF A MOTOR VEHICLE FRAME STRUCTURE AND A TRANSVERSE MEMBER

[75] Inventor: Shigeru Saitoh, Yokohama, Japan
[73] Assignee: Nissan Motor Company, Limited, Yokohama, Japan
[22] Filed: May 22, 1973
[21] Appl. No.: 362,842

[30] Foreign Application Priority Data
May 23, 1972 Japan............................ 47-60182

[52] U.S. Cl.................. 280/106 R, 293/62, 293/70
[51] Int. Cl............................................. B60r 19/00
[58] Field of Search .................... 280/106 R, 106 T; 180/64 R; 267/136, 141, 182; 296/28 R; 52/758 A, 758 F; 293/DIG. 3, 62, 70

[56] References Cited
UNITED STATES PATENTS
2,746,556  5/1956  Nallinger et al. ............ 280/106.5 R
3,747,969  7/1973  Diener .............................. 293/70

Primary Examiner—David Schonberg
Assistant Examiner—John A. Carroll

[57] ABSTRACT

A frame structure for use in a motor vehicle having an occupant compartment including a pair of longitudinal side frame members which extend in a longitudinal direction of the vehicle and a transverse member such as a suspension cross member or a stabilizer bar which is located substantially transversely to the longitudinal direction of the vehicle, each of the side frame members comprises in portions thereof excepting a portion located under the occupant compartment an impact absorbing member which is buckled when subjected to an impact force greater than a predetermined magnitude resulting from a collision of the vehicle, which frame structure comprises a mounting unit supporting the transverse member and having a single rod, the mounting unit being mounted on each of the impact absorbing side frame members at one point of the mounting unit through the single rod.

6 Claims, 7 Drawing Figures

PATENTED DEC 24 1974

CONNECTING MEANS BETWEEN AN IMPACT ABSORBING SIDE FRAME MEMBER OF A MOTOR VEHICLE FRAME STRUCTURE AND A TRANSVERSE MEMBER

The present invention relates to a frame structure for use in a motor vehicle and, more particularly, to a connecting means disposed between a longitudinal side frame member of a motor vehicle frame structure and an adjoining lateral member.

Most motor vehicles are provided on the underside thereof with a pair of longitudinal side frame members or side rails which extend in the longitudinal direction of the vehicle and which are located approximately in the wheel track. Each of the two side frame members is usually connected at the front portion thereof by a transverse member such as a suspension cross member to which a front wheel suspension unit is attached, a reinforcement cross member, or a stabilizer bar. The side frame members thus arranged and constructed are often constructed at their portions in the front of and in the rear of the passenger compartment of the vehicle to also serve as impact energy absorbing members which are deformed or buckled when subjected to a sudden impact force imposed on the vehicle as a result of a collision encountered by the vehicle thereby absorbing or damping the impact force to protect a vehicle occupant from serious injury by the impact. In a conventional connecting means disposed between such an impact absorbing side frame member and a cooperating transverse member, the transverse member has been connected to the impact absorbing side frame member by fixing a mounting means for the transverse member to the side frame member at two points of the mounting means by means of two suitable fastening means such as screws along the length of the side frame member. With the conventional connecting means thus constructed, the portion of the impact absorbing side frame member which has the length of the mounting means fixed to the side frame member remains unbuckled because of the increase in the rigidity of the portion when subjected to an impact force resulting from a collision of a vehicle. This fact results in the reduction of the impact absorbing effect of the impact absorbing side frame member.

It is therefore an object of the invention to eliminate the above-mentioned shortcomings encountered in the construction of the prior art connecting means.

It is further object of the invention to provide a new and improved connecting means between an impact absorbing side frame member of a motor vehicle frame structure and a transverse member.

It is still further object of the invention to provide an impact absorbing side frame member which displays an increased impact absorbing effect when subjected to a sudden impact resulting from a collision of the vehicle.

These and other objects and advantages of the invention will become more readily apparent from the following detailed description when taken in connection with the accompanying drawings in which.

Figure 1:
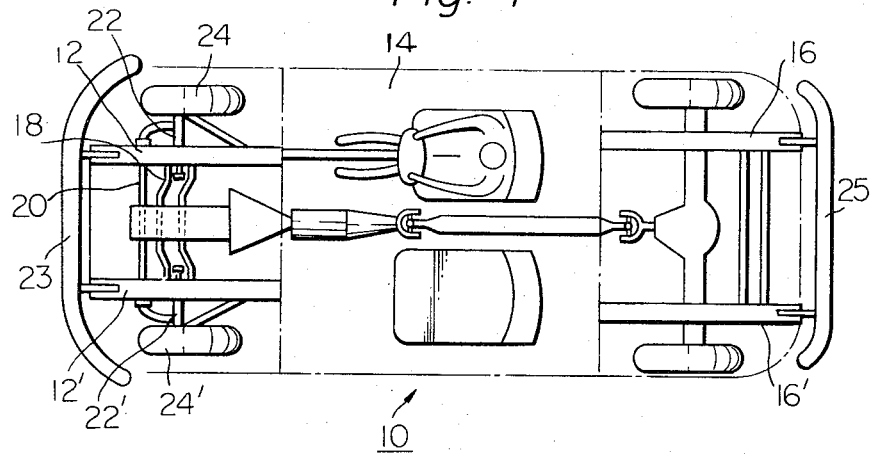
FIG. 1 is a schematic plan view of a motor vehicle having a frame structure to which the invention is applied.

Referring to FIG. 1, a motor vehicle 10 is shown as including a pair of laterally spaced, longitudinal side frame members or side rails 12 and 12' disposed in the front of an occupant or passenger compartment 14 of the motor vehicle 10 and another pair of laterally spaced, longitudinal side frame members or side rails 16 and 16' disposed in the rear of the passenger compartment 14. These two pairs of side frame members 12, 12', 16 and 16' are of box section and extend in the longitudinal direction of the vehicle 10 approximately in the wheel track. Although no such longitudinal side frame members are disposed beneath the passenger compartment, a pair of laterally spaced, longitudinal side frame members can be disposed which extend throughout the total length of the vehicle in the longitudinal direction thereof in a known manner in the art, in place of the two pairs of side frame members 12, 12', 16 and 16'. Each of the side frame members 12 and 12' is connected by a suspension cross member 18 and a stabilizer bar 20 which are located substantially transversely to the longitudinal axis of the vehicle 10. The suspension cross member 18 is mounted with right and left front wheel suspension links 22 and 22'. The front wheel suspension links 22 and 22' retain at ends thereof right and left front wheels 24 and 24', respectively and are connected with each other by the stabilizer bar 20. Each of the side frame members 12, 12', 16 and 16' is made up of an impact energy absorbing member which is deformable or compressible when subjected to a sudden impact force greater than a predetermined magnitude imposed on the vehicle as a result of a collision experienced by the vehicle. This is for the purpose to absorb and dampen the energy of the sudden impact for protecting a vehicle occupant from serious injury by the impact. In the event that such impact energy absorbing members are incorporated into a pair of longitudinal side frame members extending throughout the full length of a vehicle, the impact energy absorbing members are incorporated only into portions of the side frame members which are located in the front of and in the rear of the passenger compartment of the vehicle because it is not desirable to incorporate the impact absorbing members into portions of the side frame members which are located under the passenger compartment for preventig the passenger compartment from being compressed by the impact force. The front impact absorbing side frame members 12 and 12' are connected at forward end thereof with a front fender 23 through which an impact force is transmitted to the side frame members 12 and 12' during a collision of the vehicle 10. The rear impact absorbing side frame members 16 and 16' are connected at rearward end thereof with a fender 25 transmitting therethrough an impact force resulting from a collision to the members 16 and 16'. The impact energy absorbing member can be made up of a plurality of rectangle-sectioned hollow members which are lager in cross section and a plurality of rectangle-sectioned hollow members which are smaller in cross section by connecting these members in series in such a manner as to insert a part of a member which is smaller in cross section into a member which is larger in cross section. The impact energy absorbing member employed in this manner normally serves as a normal longitudinal side frame member of a frame structure. The invention is applied to a mounting means employed between an impact energy absorbing member constituting the longitudinal side frame member 12 or 12' and a transverse member such as the suspension cross member 18 or the stabilizer bar 20 which is located substantially perpendicularly to the side frame member. The invention will be described such that the stabilizer bar 20 is employed as an example of the transverse member. The construction of a mounting means employed between the impact absorbing side frame member 12 and the stabilizer bar 20 is similar to that of a mounting means employed between the impact absorbing side frame member 12' and the stabilizer bar 20. Thus, the invention will be described in a case in which the impact energy absorbing side frame member 12 is taken as an example of the impact absorbing side frame member.

Figure 2:
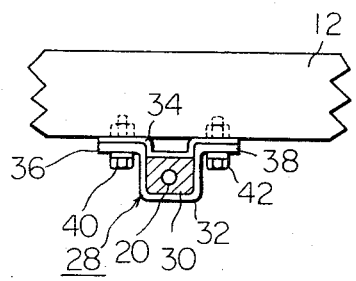
FIG. 2 is a front view, partly shown in cross section, of an example of a conventional connection means between an impact absorbing side frame member and a stabilizer bar.
Figure 3:
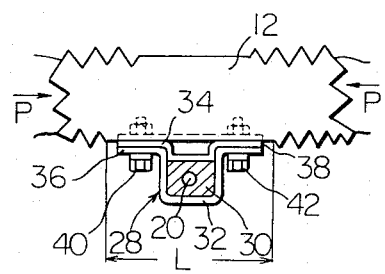
FIG. 3 is a view similar to FIG. 2, but showing the impact absorbing side frame member which is deformed or compressed due to an impact force acting thereon.

FIGS. 2 and 3 show the construction of a prior art mounting means or unit 28 employed between the impact absorbing side frame member 12 and the stabilizer bar 20. As shown, the prior art mounting unit 28 mounts the stabilizer bar 20 through a rubber bushing member 30. The rubber bushing member 30 receives therein the stabilizer bar 20. The mounting unit 28 has a first mounting bracket 32 and a second mounting bracket 34 which retain therebetween the rubber bushing member 30. The mounting unit 28 is mounted on the impact absorbing side frame member 12 at two points of the mounting unit 28 along the length of the frame member 12 through two flanges 36 and 38 formed on both sides of the mounting unit 28 by means of two screws 40 and 42. FIG. 3 shows a condition of the impact absorbing side frame member 12 which is compressed due to an impact force P acting in the longitudinal direction of the member 12. As be apparent from FIG. 3, the impact absorbing side frame member 12 is unbuckled at a portion thereof having a length of L along which portion the mounting unit 28 is tightly fastened. This is caused because of the increase of the resistance to an impact force, i.e., the increase of the stiffness of the cross section of the portion which results from the attaching of the mounting unit 28 to the portion. This fact results in the lowering of the impact absorbing performance of the impact absorbing side frame member.

The present invention contemplates to reduce the length L of the portion of an impact absorbing side frame member mounting a connecting means which portion remains unbuckled when subjected to an impact force greater than a predetermined magnitude.

Figure 4:
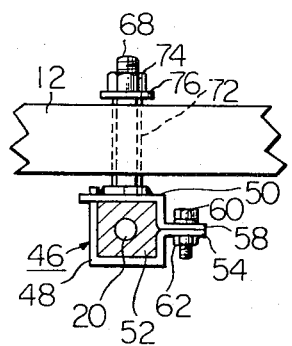
FIG. 4 is a front view of a preferred embodiment of a connection means, according to the invention, between an impact absorbing side frame member and a stabilizer bar.
Figure 5:
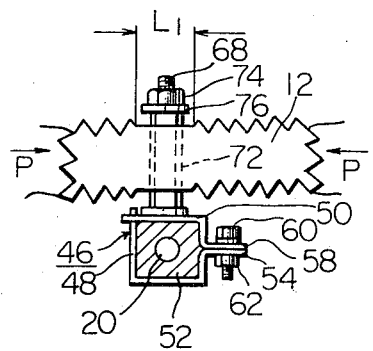
FIG. 5 is a view similar to FIG. 4, but showing the impact absorbing side frame member which is deformed or compressed due to an impact force acting thereon.
Figure 6:
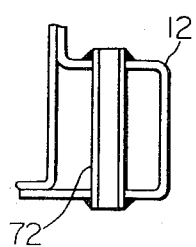
FIG. 6 is an enlarged cross-sectional view of a part of the connection means shown in FIGS. 4 and 5.
Figure 7:
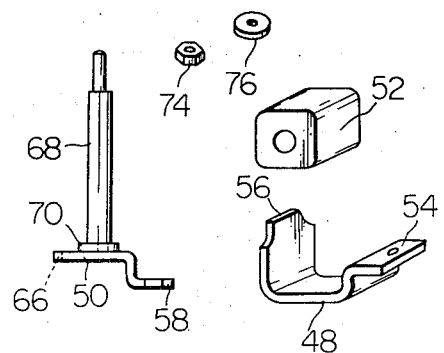
FIG. 7 is an exploded view of component elements of the connection means shown in FIGS. 4 and 5.

FIGS. 4 to 7 show a preferred embodiment of a mounting means according to the invention employed between an impact absorbing side frame member and a transverse member implementing the present invention. In FIGS. 4 and 5, like component parts are designated by the same reference numerals as those used in FIGS. 2 and 3. As shown, a mounting unit 46 according to the invention supports the stabilizer bar 20 and mount the same on the impact absorbing side frame member 12. The mounting unit 46 has a first mounting bracket 48 and a second mounting bracket 50 which support in cooperation with each other the stabilizer bar 20 through a bushing member 52 of a resilient material such as rubber. The bushing member 52 receives therein the stabilizer bar 20 and damps and absorbs the movement of the stabilizer bar 20 to prevent the mounting unit 46 from being damaged by the stabilizer bar 20. As shown in FIG. 7, the first mounting bracket 48 is formed at one end thereof with a flange 54 and at the other end thereof with an end portion 56 having a reduced width. The second mounting bracket 50 is formed at one end thereof with a flange 58 which is connected with the flange 54 of the first mounting bracket 48 by means of a suitable fastening means such as a bolt 60 and a nut 62 when the brackets 48 and 50 are assembled. The second mounting bracket 50 is also formed at the other end thereof with a recess 66 (shown in dotted line in FIG. 7) which engages the reduced end portion 56 of the first mounting bracket 48 when the brackets 48 and 50 are assembled. The first and second mounting brackets 48 and 50 define a box section space therebetween when assembled thereby securely retaining therein the bushing member 52. A rod 68 is fixedly attached to an outer surface of the second mounting bracket 50 through a seat metal 70. The rod 68 has a threaded end portion. The impact absorbing side frame member 12 is provided with a tube 72 which vertically passes through the member 12 and which is welded to the outer surfaces of the member 12. The mounting unit 46 is securely fixed to the impact absorbing side frame member 12 by inserting the rod 68 into the tube 72 and by fastening the rod 68 with a nut 74 through a washer 76. Thus, the mounting unit 46 is mounted on the impact absorbing side frame member 12 at one point of the mounting unit 46 through a single rod 68. FIG. 5 shows a condition of the impact absorbing side frame member 12 which is compressed due to an impact force P greater than a predetermined magnitude which is imposed on the member 12 as a result of a collision of the vehicle 10. As shown in FIG. 5, the impact absorbing side frame member 12 remains unbuckled at the portion of the side frame member 12 having the length of $L_1$ along which portion the tube 72 is fixed to the member 12. The length $L_1$ corresponds to the diameter of the tube 72 and accordingly is by far shorter than the length L of the portion of the side frame member 12 which is remained uncompressed in the case of the conventional connection means 26 shown in FIG. 3. Therefore, the impact absorbing side frame member 12 is capable of absorbing an excessive impact energy which corresponds to the length L minus the length $L_1$ as compared with the impact absorbing side frame member 12 cooperating with the prior art connection meanss 26.

It is thus understood that an impact absorbing side frame member cooperating with the connecting means according to the invention can be compressed to the extent to minimize the length of the portion which remains unbuckled and accordingly can absorb an impact energy to a maximum extent thereby increasing its impact absorbing performance.

Although the invention has been described such that the stabilizer bar is taken as an example of the transverse member, the invention can be also applied to a combination of the impact absorbing side frame member 12 and the other transverse member such as the suspension cross member 18. In this instance, the first and second mounting brackets 48 and 50 and the bushing member 52 can be easily modified to those having suitable sizes and dimensions in such a manner as to be able to mount the other transverse member.

What is claimed is:

1. A frame structure for use in a motor vehicle having an occupant compartment including a pair of longitudinal side frame members extending in a longitudinal direction of said vehicle, and a transverse member located substantially transversely to said longitudinal direction of said vehicle, comprising a mounting unit for connecting said transverse member to each of said side frame members which unit supports said transverse member and which unit has at least one rod, said mounting unit being mounted on the corresponding side frame member through said rod, wherein said rod of said mounting unit comprises a single rod, each of said side frame members is formed in opposite surfaces thereof with a hole for receiving said single rod, and wherein each of said side frame members is provided with a tube for inserting said rod thereinto, said tube being received in said holes and being securely fixed to said side frame member.

2. In a motor vehicle, the combination comprising a longitudinal side frame member extending in a longitudinal direction of said vehicle, a transverse member extending substantially perpendicular to said longitudinal direction of said vehicle, and a mounting unit which supports said transverse member and to which a single rod is connected, said mounting unit being mounted on said side frame member through said single rod extending therethrough.

3. The combination as claimed in claim 2, in which said side frame member is provided with a tube which extends therethrough and which is securely fixed thereto, said single rod being received through said tube.

4. The combination as claimed in claim 2, further comprising an occupant compartment, in which said side frame member comprises in portions thereof in front and rear of said occupant compartment an impact absorbing member which is buckled when subjected to an impact force greater than a predetermined magnitude.

5. The combination as claimed in claim 2, in which said transverse member comprises a stabilizer bar for connecting right and left front wheel suspension links of said vehicle.

6. The combination as claimed in claim 5, in which said mounting unit comprises two brackets defining therebetween a space which is in the form of a box in cross section and a resilient bushing member retained in said space, said stabilizer bar passing through said resilient bushing member.

* * * * *